US 12,179,840 B2

(12) United States Patent
Nusier et al.

(10) Patent No.: US 12,179,840 B2
(45) Date of Patent: Dec. 31, 2024

(54) NOTCHES OF FRAME RAILS OF THREE-WHEELED VEHICLE

(71) Applicant: Ford Global Technologies, LLC, Dearborn, MI (US)

(72) Inventors: Saied Nusier, Canton, MI (US); Jamel E. Belwafa, Ann Arbor, MI (US); Srinivasan Sundararajan, Ann Arbor, MI (US); Rahul Arora, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/307,250

(22) Filed: Apr. 26, 2023

(65) Prior Publication Data
US 2024/0359744 A1 Oct. 31, 2024

(51) Int. Cl.
*B62D 21/15* (2006.01)
*B62D 21/02* (2006.01)
*B62D 61/08* (2006.01)

(52) U.S. Cl.
CPC .............. *B62D 21/15* (2013.01); *B62D 21/02* (2013.01); *B62D 61/08* (2013.01)

(58) Field of Classification Search
CPC ......... B62D 21/15; B62D 21/02; B62D 61/08
See application file for complete search history.

(56) References Cited

U.S. PATENT DOCUMENTS 5,094,313 A * 3/1992 Mauws ................. B62D 61/08
180/908
5,950,755 A * 9/1999 Kemmerer ............. B62D 61/08
180/216

(Continued)

FOREIGN PATENT DOCUMENTS

| CN | 103707970 A | 4/2014 |
| CN | 206766235 U | 12/2017 |
| CN | 209064263 U | 7/2019 |

OTHER PUBLICATIONS

Arun et al., "Electric Vehicle Chassis Design and Structural Analysis by using CAD and CAE Techniques", International Journal of Research in Engineering, Science and Management vol. 2, Issue-4, Apr. 2019 www.ijresm.com I ISSN (Online): 2581-5792.

*Primary Examiner* — Paul N Dickson
*Assistant Examiner* — Shams Dhanani
(74) *Attorney, Agent, or Firm* — Frank A. MacKenzie; Bejin Bieneman PLC

(57) ABSTRACT

A vehicle includes a vehicle frame including a first frame rail, a second frame rail spaced cross-vehicle from the first frame rail, and a middle frame rail between the first frame rail and the second frame rail. The first frame rail and the second frame rail each have a vehicle-inboard side facing toward the middle frame rail. The vehicle-inboard sides each define a plurality of notches. The middle frame rail has a downward side facing downwardly and perpendicular to the vehicle-inboard sides. The downward side defining a plurality of notches. The vehicle frame has a rear cross-member and a front cross-member spaced vehicle-forward of the rear cross-member. The rear cross-member and the front cross-member are between the first frame rail and the second (Continued)

frame rail. The notches of the vehicle-inboard sides and the notches of the downward side are between the rear cross-member and the front cross-member.

17 Claims, 10 Drawing Sheets

(56) References Cited

U.S. PATENT DOCUMENTS

| | | | |
|---|---|---|---|
| 2005/0211520 A1* | 9/2005 | Abu-Odeh | F16F 7/12 |
| | | | 188/377 |
| 2013/0056293 A1 | 3/2013 | Schurna et al. | |
| 2014/0354008 A1* | 12/2014 | Sakakibara | B62D 21/152 |
| | | | 296/187.1 |
| 2015/0151792 A1* | 6/2015 | Mori | B62D 21/152 |
| | | | 296/187.09 |
| 2016/0207573 A1* | 7/2016 | Kitakata | B60R 19/12 |
| 2017/0113728 A1* | 4/2017 | Garay Serrano | B62D 21/157 |
| 2017/0151921 A1* | 6/2017 | Staines | B21D 53/88 |
| 2018/0043937 A1* | 2/2018 | Sopel | B62D 21/152 |
| 2019/0016387 A1* | 1/2019 | Elbkaily | B62D 21/02 |
| 2019/0061822 A1* | 2/2019 | Thomas | B62D 27/00 |
| 2019/0344829 A1* | 11/2019 | Abushawashi | B62D 21/157 |
| 2021/0403091 A1* | 12/2021 | Stronach | B62D 31/003 |
| 2022/0227447 A1* | 7/2022 | McMillian | B62K 5/027 |
| 2023/0202564 A1* | 6/2023 | Bodin | B62D 21/02 |
| | | | 296/205 |

* cited by examiner

NOTCHES OF FRAME RAILS OF THREE-WHEELED VEHICLE

BACKGROUND

Three-wheeled vehicles are lightweight, affordable vehicles used in urban transportation. Three-wheeled vehicles can be designed to accommodate a single-occupant or multiple occupants. Three-wheeled vehicles may have features that control deformation of a body and/or frame of the vehicle and/or other external components of the vehicle in the event of certain vehicle impacts, e.g., certain frontal vehicle impacts.

DETAILED DESCRIPTION

Figure 1:
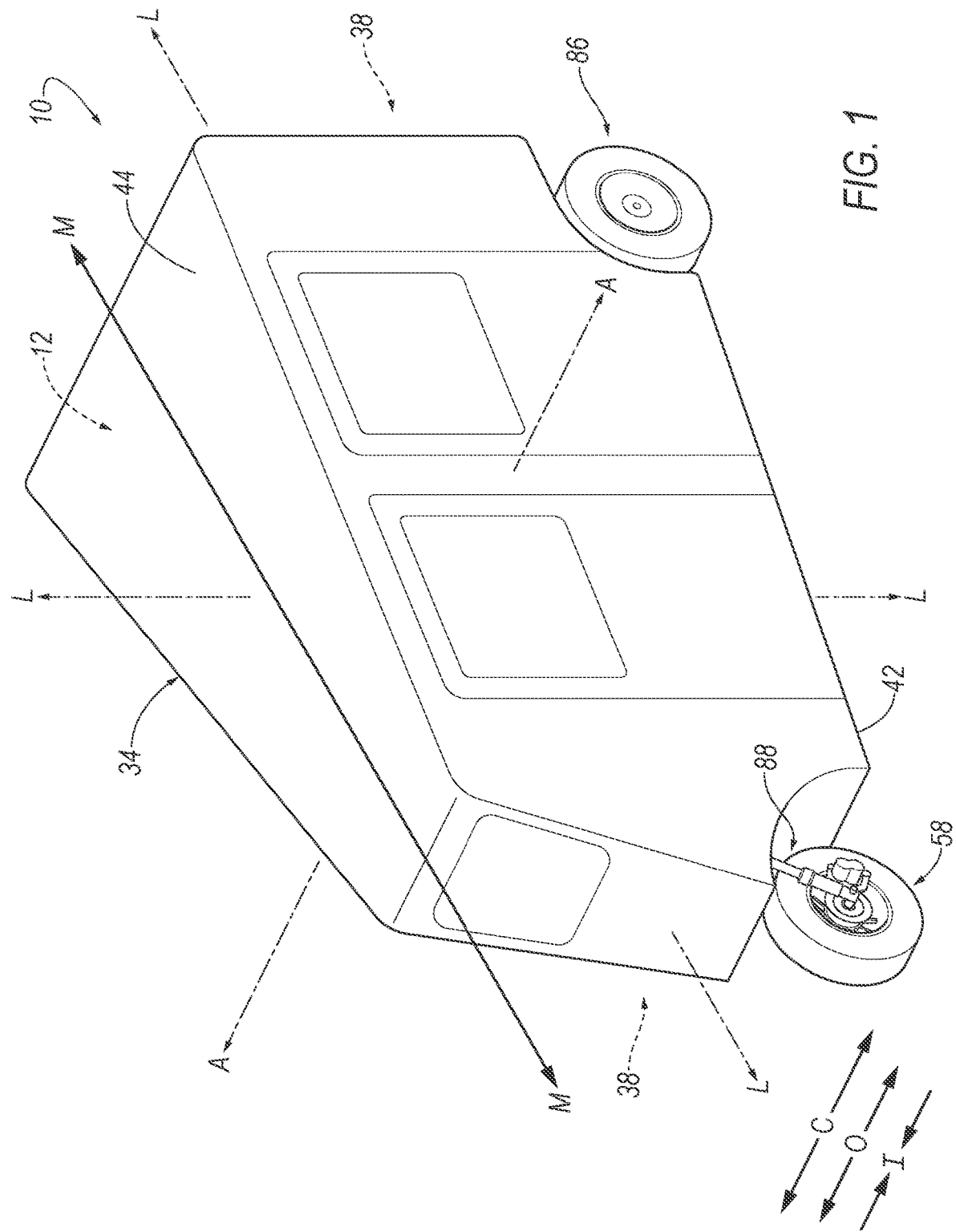
FIG. 1 is a perspective view of a three-wheeled vehicle.

A vehicle includes a vehicle frame including a first frame rail, a second frame rail spaced cross-vehicle from the first frame rail, and a middle frame rail between the first frame rail and the second frame rail. The first frame rail and the second frame rail each have a vehicle-inboard side facing toward the middle frame rail. The vehicle-inboard sides each define a plurality of notches. The middle frame rail has a downward side facing downwardly and perpendicular to the vehicle-inboard sides. The downward side defines a plurality of notches. The vehicle frame has a rear cross-member and a front cross-member spaced vehicle-forward of the rear cross-member. The rear cross-member and the front cross-member are between the first frame rail and the second frame rail. The notches of the vehicle-inboard sides and the notches of the downward side are between the rear cross-member and the front cross-member.

The first frame rail, the second frame rail, and the middle frame rail may be elongated along a vehicle-longitudinal axis. The notches of the vehicle-inboard sides and the notches of the downward side may be spaced equidistantly along the vehicle-longitudinal axis.

The front cross-member and the rear cross-member may be elongated along a cross-vehicle axis. The notches of the downward side may be elongated along the cross-vehicle axis.

The vehicle-inboard sides may be elongated along a vertical axis. The notches of the vehicle-inboard sides may be elongated along the vertical axis.

The notches of the vehicle-inboard sides may face toward the middle frame rail.

The first frame rail and the second frame rail may include a vehicle-outboard side spaced vehicle-outboard from the vehicle-inboard side. A distance between the vehicle-inboard side and the vehicle-outboard side may be larger between the notches than at the notches.

A second front cross-member may be spaced cross-vehicle from the front cross-member. The front cross-member may extend from the first frame rail toward the middle frame rail and the second front cross-member may extend from the second frame rail toward the middle frame rail. A second rear cross-member may be spaced cross-vehicle from the rear cross-member. The rear cross-member may extend from the first frame rail to the middle frame rail and the second rear cross-member extending from the second frame rail to the middle frame rail.

The notches of the first frame rail may be spaced equidistantly from the front cross-member to the rear cross-member and the notches of the second frame rail may be spaced equidistantly from the second front cross-member to the second rear cross-member.

The middle frame rail may be spaced vehicle-inboard from the first frame rail and the second frame rail.

The middle frame rail may be elongated from the rear cross-member to a distal end. The notches of the downward side may be spaced equidistantly between the rear cross-member and the distal end.

The first frame rail, the second frame rail, and the middle frame rail may be designed to be deformable along the notches when a force is applied along the middle rail.

The vehicle may include a seat positioned adjacent the rear cross-member.

The notches of the vehicle-inboard side and the notches of the downward side may be vehicle-forward of the seat.

The front cross-member may be vehicle-forward of the seat.

The vehicle may include a wheel vehicle-forward of the vehicle frame and a midline spaced equidistantly from the first frame rail and the second frame rail. The wheel may be aligned with the midline in a cross-vehicle direction.

The middle frame rail may be aligned with the midline and the wheel.

The first frame rail, the second frame rail, and the middle frame rail may be designed to be deformable along the notches when a force is applied at the wheel.

With reference to the Figures, wherein like numerals indicate like parts throughout the several views, a vehicle 10, specifically a three-wheeled vehicle 10, includes a vehicle frame 12 including a first frame rail 14, a second frame rail 16 spaced cross-vehicle from the first frame rail 14, and a middle frame rail 18 between the first frame rail 14 and the second frame rail 16. The first frame rail 14 and the second frame rail 16 each have a vehicle-inboard side 20 facing toward the middle frame rail 18. The vehicle-inboard sides 20 each define a plurality of notches 22, 24. The middle frame rail 18 has a downward side 26 facing downwardly and perpendicular to the vehicle-inboard sides 20. The downward side 26 defining a plurality of notches 28. The vehicle frame 12 has a rear cross-member 30 and a front cross-member 32 spaced vehicle-forward of the rear cross-member 30. The rear cross-member 30 and the front cross-member 32 are between the first frame rail 14 and the second frame rail 16. The notches 22, 24 of the vehicle-inboard sides 20 and the notches 28 of the downward side 26 are between the rear cross-member 30 and the front cross-member 32.

The notches 22, 24, 28 of the first frame rail 14, the second frame rail 16, and the middle frame rail 18 allow the first frame rail 14, the second frame rail 16, and the middle frame rail 18 to deform in the event of certain vehicle impacts. In the event of certain vehicle impacts, the notches 22, 24, 28 may collapse to manage deformation into the three-wheeled vehicle 10. The notches 22, 24 of the first frame rail 14 and the second frame rail 16 to deform vehicle-inboard and upwardly and the notches 28 of the middle frame rail 18 deforms longitudinally and upwardly to manage deformation into the three-wheeled vehicle 10.

With reference to FIG. 1, the three-wheeled vehicle 10 may be any suitable type of ground vehicle, e.g., a passenger or commercial automobile. For example, the three-wheeled vehicle 10 may be any suitable type of ground vehicle, e.g., a motorized tricycle, auto rickshaw, tuk, etc. As shown in the Figures, the three-wheeled vehicle 10 may be a motorcycle-based vehicle.

The three-wheeled vehicle 10 defines a vehicle-longitudinal axis L extending between a front vehicle end (not numbered) and a rear vehicle end (not numbered) of the three-wheeled vehicle 10. The three-wheeled vehicle 10 defines a cross-vehicle axis A extending cross-vehicle from one side to the other side of the three-wheeled vehicle 10. A cross-vehicle direction C is parallel to the cross-vehicle axis A. The three-wheeled vehicle 10 defines a vertical axis V. The vehicle-longitudinal axis L, the cross-vehicle axis A, and the vertical axis V are perpendicular relative to each other.

The three-wheeled vehicle 10 includes the vehicle frame 12 and a vehicle body 34. The vehicle frame 12 may be of a unibody construction in which the vehicle frame 12 is unitary with the vehicle body 34 including frame rails 14, 16, 18, pillars and/or posts 46, 48, roof rails, etc. As another example, the vehicle body 34 and vehicle frame 12 may have a body-on-frame construction also referred to as a cab-on-frame construction in which the vehicle body 34 and vehicle frame 12 are separate components, i.e., are modular, and the vehicle body 34 is supported on and affixed to the vehicle frame 12. Alternatively, the vehicle frame 12 and vehicle body 34 may have any suitable construction. The vehicle frame 12 and vehicle body 34 may be of any suitable material, for example, steel, aluminum, and/or fiber-reinforced plastic, etc.

Figure 2:
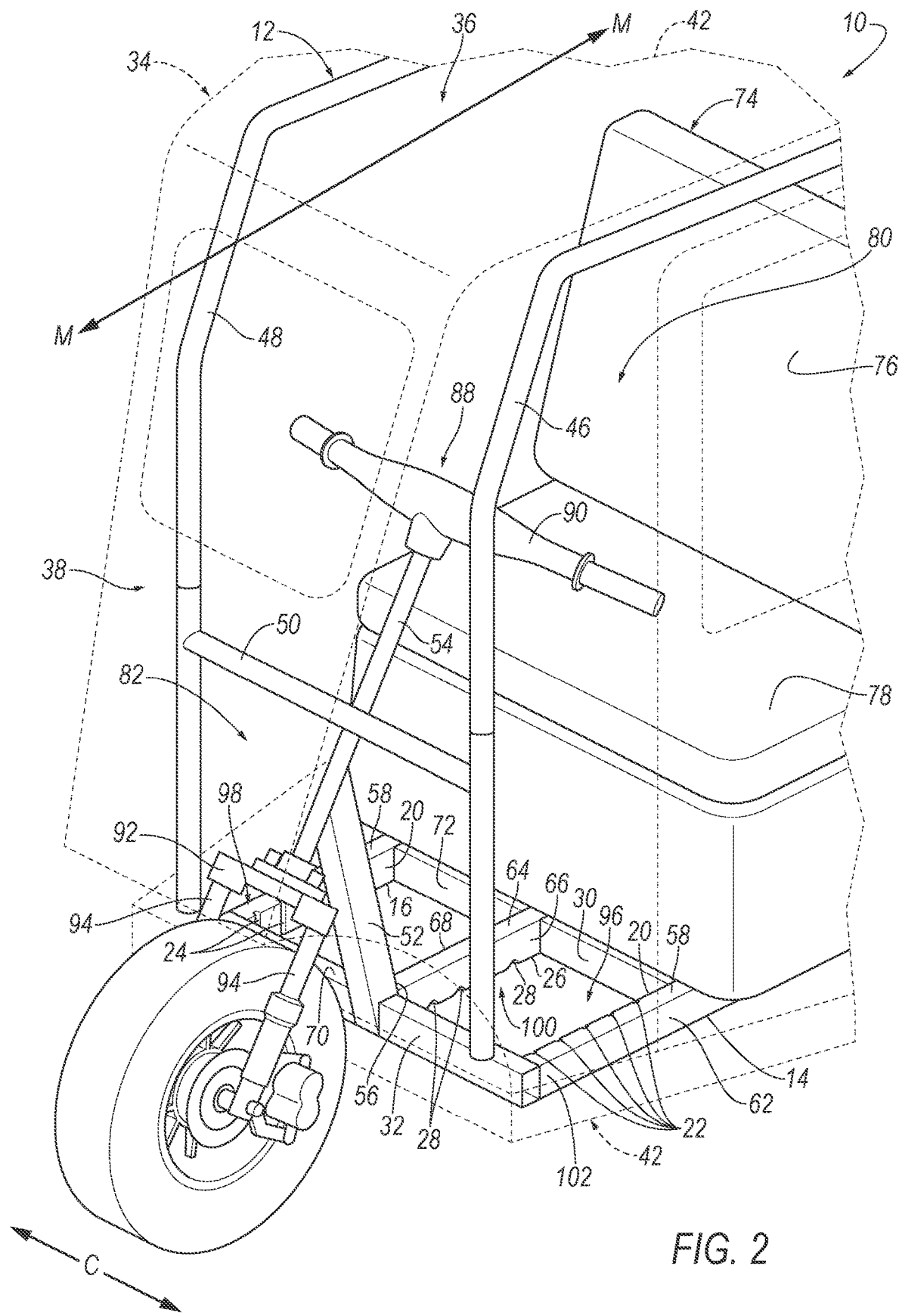
FIG. 2 is a perspective view of a vehicle frame of the three-wheeled vehicle.

With reference to FIG. 2, the three-wheeled vehicle 10 may house one or more occupants. Specifically, the vehicle frame 12 defines an occupant compartment 36 to house one or more occupants of the three-wheeled vehicle 10. The occupant compartment 36 may extend across the three-wheeled vehicle 10, i.e., from one side to the other side of the three-wheeled vehicle 10. The occupant compartment 36 may extend from a front end 38 to a rear end 40 with the front end 38 being in front of the rear end 40 during forward motion of the three-wheeled vehicle 10. The three-wheeled vehicle 10 may accommodate one or more occupants. For example, as shown in the Figures, the three-wheeled vehicle 10 may accommodate more than one occupant, e.g., two or three occupants. In other examples not shown in the Figures, the three-wheeled vehicle 10 may accommodate a single occupant. In other words, the occupant compartment 36 is sized and shaped to house only one occupant.

The three-wheeled vehicle 10 may define a midline M elongated along the vehicle-longitudinal axis L, i.e., vehicle fore-and-aft. The midline M of the vehicle frame 12 may be spaced equidistantly from each side of the three-wheeled vehicle 10. In other words, the midline M is in the middle of the vehicle frame 12. The vehicle frame 12 is elongated along the midline M and the vehicle-longitudinal axis L. Specifically, the vehicle frame 12 is elongated from the front end 38 to the rear end 40 along the midline M and the vehicle-longitudinal.

With continued reference to FIG. 1, the three-wheeled vehicle 10 may include body panels (not numbered). The body panels may be supported by the vehicle frame 12. Specifically, the body panels may be fixed to the vehicle frame 12. The body panels may be fixed to the vehicle frame 12 in any suitable manner, e.g., fasteners, welding, etc. The three-wheeled vehicle 10 may include any suitable number of body panels supported by the vehicle frame 12 at any suitable location of the three-wheeled vehicle 10. For example, the three-wheeled vehicle 10 may include a body panel supported by each side of the three-wheeled vehicle 10, a vehicle floor 42, a vehicle roof 44, etc. The body panels may be made of any suitable material, e.g., steel, aluminum, composite, plastic, etc.

The vehicle roof 44 and the vehicle floor 42 are spaced from each other. Specifically, the vehicle floor 42 is spaced downwardly from the vehicle roof 44. The vehicle roof 44 defines the upper boundary of the occupant compartment 36 and may extend from the front end 38 of the occupant compartment 36 to the rear end 40 of the occupant compartment 36.

The vehicle floor 42 defines the lower boundary of the occupant compartment 36 and may extend from the front end 38 of the occupant compartment 36 to the rear end 40 of the occupant compartment 36. The vehicle floor 42 may include upholstery, for example, carpet, and may have a class-A surface facing the occupant compartment 36, i.e., a surface specifically manufactured to have a high quality, finished, aesthetic appearance free of blemishes.

The vehicle frame 12 may extend from the front end 38 to the rear end 40. The rear end 40 may be wider than the front end 38. Because the vehicle frame 12 is wider at the rear end 40 than at the front end 38, more occupants may be able to be housed at the rear end 40 of the vehicle frame 12 and occupant compartment 36.

With reference to FIGS. 2-5F, the vehicle frame 12 may include any suitable number of members (not all shown) to define a shape of the three-wheeled vehicle 10. As an example, as shown in the Figures, the vehicle frame 12 includes a first post 46 and a second post 48 spaced cross-vehicle from each other at the front end 38 and a cross-post 50 extending from the first post 46 to the second post 48. As described further below, the three-wheeled vehicle 10 includes a plurality of frame rails 14, 16, 18 and cross-members 30, 32, 70, 72 supporting the vehicle floor 42. The three-wheeled vehicle 10 may include any other suitable number of members.

The vehicle frame 12 includes the first frame rail 14, the second frame rail 16, the middle frame rail 18, a pair of front cross-members 32, 70, and a pair of rear cross-members 30, 72. The first frame rail 14 and the second frame rail 16 are spaced cross-vehicle from each other. In other words, the first frame rail 14 and the second frame rail 16 are spaced from each other in the cross-vehicle direction C. The first frame rail 14 is elongated along one side of the three-wheeled vehicle 10 and the second frame rail 16 is elongated along the other side of the three-wheeled vehicle 10. In other words, the first frame rail 14 and the second frame rail 16 are each on either side of the midline M of the three-wheeled vehicle 10 and are spaced equidistantly from the midline M on each side of the midline M. In other words, the midline M is spaced equidistantly from the first frame rail 14 and the second frame rail 16 between the first frame rail 14 and the second frame rail 16. The first frame rail 14 and the second frame rail 16 are elongated from the front vehicle end to the rear vehicle end. Specifically, the first frame rail 14 and the second frame rail 16 may each be elongated from a first end 102 at the front vehicle end to the second end (not shown) at the rear vehicle end. The first frame rail 14 and the second frame rail 16 are elongated along the vehicle-longitudinal axis L. Specifically, the first frame rail 14, the second frame rail 16 are elongated along the vehicle-longitudinal axis L from the front vehicle end to the rear vehicle end.

The middle frame rail 18 is between the first frame rail 14 and the second frame rail 16. The middle frame rail 18 is spaced from the first frame rail 14 and the second frame rail 16. In other words, the middle frame rail 18 is spaced vehicle-inboard from the first frame rail 14 and the second frame rail 16. The middle frame rail 18 may be aligned with the midline M of the three-wheeled vehicle 10. In other words, the middle frame rail 18 is spaced equidistantly from the each of the first frame rail 14 and the second frame rail 16. The middle frame rail 18 may be elongated from the front vehicle end to the rear vehicle end. Specifically, the middle frame rail 18 is elongated along the vehicle-longitudinal axis L from the front vehicle end to the rear vehicle end.

The vehicle frame 12 includes a floor frame member 52 extending upwardly from the vehicle floor 42 to a steering post 54 of the three-wheeled vehicle 10. The middle frame rail 18 may be connected to the floor frame member 52. In other words, the middle frame rail 18 is elongated from the rear end 40 toward the floor frame member 52. The middle frame rail 18 is elongated from the rear end 40 to a distal end 56. The distal end 56 may be connected to the floor frame member 52. Specifically, the distal end 56 of the middle frame rail 18 is fixed to the floor frame member 52. The middle frame rail 18 may be fixed to the floor frame member 52 in any suitable way, e.g., welding, fasteners, etc.

Each of the first frame rail 14 and the second frame rail 16 has a plurality of sides 20, 58, 60, 62 facing in various directions. Specifically, the first frame rail 14 and the second frame rail 16 each have a top side 58 facing upwardly, a bottom side 60 facing downwardly, the vehicle-inboard side 20 facing toward the middle frame rail 18, and a vehicle-outboard side 62 facing away from the middle frame rail 18. The top sides 58 and the bottom sides 60 may be perpendicular to the vehicle-inboard sides 20 and the vehicle-outboard sides 62. In other words, an angle between the top sides 58 with the vehicle-inboard sides 20 and the vehicle-outboard sides 62 is 90 degrees and an angle between the bottom sides 60 with the vehicle-inboard sides 20 and the vehicle-outboard sides 62 is 90 degrees. Specifically, the first frame rail 14 and the second frame rail 16 may have a rectangular or square shaped cross-section. The top sides 58 and the bottom sides 60 may be of equal width relative to each other. The vehicle-inboard sides 20 and the vehicle-outboard sides 62 may be of equal width relative to each other.

The top sides 58 and the bottom sides 60 each define a length elongated along the entire length of the first frame rail 14 and the second frame rail 16. The top sides 58 and the bottom sides 60 define a width that extends in the cross-vehicle direction C. The top sides 58 and the bottom sides 60 each extend from the vehicle-inboard sides 20 to the vehicle-outboard sides 62. In other words, the width of the top sides 58 and the bottom sides 60 is defined by a distance between the vehicle-inboard sides 20 and the vehicle-outboard sides 62. The top sides 58 and the bottom sides 60 are spaced from each other by the vehicle-inboard sides 20 and the vehicle-outboard sides 62. Specifically, the top sides 58 and the bottom sides 60 are spaced from each other along the vertical axis V by the vehicle-inboard sides 20 and the vehicle-outboard sides 62.

The top sides 58 and the bottom sides 60 each face in opposite directions along the vertical axis V and the top sides 58. Specifically, the top sides 58 face upwardly along the vertical axis V and the bottom space face downwardly along the vertical axis V. In other words, the top sides 58 may face upwardly toward the occupant compartment 36 and the bottom sides 60 may face downwardly toward the roadway exterior to the three-wheeled vehicle 10.

The vehicle-outboard sides 62 are spaced vehicle-outboard from the vehicle-inboard sides 20. In other words, the vehicle-outboard sides 62 are vehicle-outboard of the vehicle-inboard sides 20 along the cross-vehicle axis A, i.e., the vehicle-inboard sides 20 and the vehicle-outboard sides 62 are spaced from each other by the top sides 58 and the bottom sides 60. The vehicle-inboard sides 20 and the vehicle-outboard sides 62 define a length that is elongated along the entire length of the first frame rail 14 and the second frame rail 16. The vehicle-inboard sides 20 and the vehicle-outboard sides 62 define a width that extends in a vertical direction DV along the vertical axis V. The vehicle-inboard sides 20 extend from the top sides 58 to the bottom sides 60 and the vehicle-outboard sides 62 extend from the top sides 58 to the bottom sides 60. In other words, the width of the vehicle-inboard sides 20 and the vehicle-outboard sides 62 is defined by a distance between the top sides 58 and the bottom sides 60. The vehicle-inboard sides 20 and the vehicle-outboard sides 62 each face opposite directions along the cross-vehicle axis A. Specifically, the vehicle-inboard sides 20 face in a vehicle-inboard direction I along the cross-vehicle axis A toward the middle frame rail 18 and the vehicle-outboard sides 62 face in a vehicle-outboard direction O along the cross-vehicle axis A away from the middle frame rail 18, e.g., toward an exterior of the three-wheeled vehicle 10.

With continued reference to FIGS. 2-5F, the middle frame rail 18 has a plurality of sides 26, 64, 66, 68 facing in various directions. The middle frame rail 18 includes an upward side 64 facing upwardly, the downward side 26 facing downwardly, a first rail side 66 facing toward the first frame rail 14, and a second rail side 68 facing toward the second frame rail 16. The upward side 64 and the downward side 26 are perpendicular to the first rail side 66 and the second rail side 68. In other words, an angle between the upward side 64 and the first rail side 66 and the second rail side 68 is 90 degrees and an angle between the downward side 26 and the first rail side 66 and the second rail side 68 is 90 degrees. Specifically, the middle frame rail 18 may have a rectangular or square shaped cross-section. The upward side 64 and the downward side 26 may be of equal width relative to each other. The first rail side 66 and the second rail side 68 may be of equal width relative to each other.

The upward side 64 and the downward side 26 each define a length elongated along the entire length of the middle frame rail 18. The upward side 64 and the downward side 26 each define a width that extends in the cross-vehicle direction C. The upward side 64 and the downward side 26 each extend from the first rail side 66 to the second rail side 68. In other words, the widths of the upward side 64 and the downward side 26 are defined by a distance between the first rail side 66 and the second rail side 68. The upward side 64 and the downward side 26 are each spaced from each other along the vertical axis V. Specifically, the upward side 64 and the downward side 26 are each spaced from each other along the vertical axis V by the first rail side 66 and the second rail side 68.

The upward side 64 and the downward side 26 each face in opposite directions along the vertical axis V. Specifically, the upward side 64 faces upwardly along the vertical axis V and the downward side 26 faces downwardly along the vertical axis V. In other words, the upward side 64 may face upwardly toward the occupant compartment 36 and the downward side 26 may face toward the roadway exterior to the three-wheeled vehicle 10.

The upward side 64 and the downward side 26 are perpendicular to the vehicle-inboard sides 20 of the first frame rail 14 and the second frame rail 16. In other words, the plane along which the upward side 64 and the downward side 26 extend is perpendicular to the plane along which the vehicle-inboard sides 20 of the first frame rail 14 and the second frame rail 16 extend. Specifically, an angle between the planes is 90 degrees.

The first rail side 66 and the second rail side 68 are spaced from each other along the cross-vehicle axis A. Specifically, the first rail side 66 and the second rail side 68 may be spaced from each other by the upward side 64 and the downward side 26. The first rail side 66 and the second frame side each define a length that is elongated along the entire length of the middle frame rail 18. The first rail side 66 and the second frame side each define a width that extends in the vertical direction DV along the vertical axis V. The first rail side 66 and the second rail side 68 each extend from the upward side 64 to the downward side 26. In other words, the widths of the first rail side 66 and the second rail side 68 are defined by a distance between the upward side 64 and the downward side 26. The first rail side 66 and the second rail side 68 each face opposite directions along the cross-vehicle axis A. Specifically, the first rail side 66 and the second rail side 68 each face in the vehicle-outboard direction O along the cross-vehicle axis A toward the first frame rail 14 and the second frame rail 16. Specifically, the first rail side 66 faces toward the first frame rail 14 and the second rail side 68 faces toward the second frame rail 16.

With continued reference to FIGS. 2-5F, the vehicle frame 12 includes a pair of front cross-members 32, 70 and a pair of rear cross-members 30, 72. Specifically, the vehicle frame 12 includes a first front cross-member 32, a second front cross-member 70, a first rear cross-member 30, and a second rear cross-member 72. The front cross-members 32, 70 are spaced vehicle-forward of the rear cross-members 30, 72. Specifically, the front cross-members 32, 70 are spaced vehicle-forward of the rear cross-members 30, 72 along the first frame rail 14 and the second frame rail 16. In other words, the front cross-members 32, 70 are spaced vehicle forward of the rear cross-members 30, 72 along the vehicle-longitudinal axis L. The front cross-members 32, 70 may be at or adjacent to the first ends 102 of the first frame rail 14 and the second frame rail 16. The rear cross-members 30, 72 are spaced vehicle-rearward from the first ends 102 of the first frame rail 14 and the second frame rail 16. Specifically, the rear cross-members 30, 72 are between the first ends 102 and the second ends of the first frame rail 14 and the second frame rail 16.

The front cross-members 32, 70 and the rear cross-members 30, 72 are between the first frame rail 14 and the second frame rail 16 in the first-vehicle direction C. Specifically, the front cross-members 32, 70 and the rear cross-members 30, 72 are each elongated along the cross-vehicle axis A between the first frame rail 14 and the second frame rail 16. The front cross-members 32, 70 are aligned with each other along the vehicle-longitudinal axis L. Specifically, the first front cross-member 32 and the second front cross-member 70 are aligned with each other between the first frame rail 14 and the second frame rail 16. In other words, the front cross-members 32, 70 are aligned with each other and are both elongated coaxially along the cross-vehicle axis A. The front cross-members 32, 70 are aligned with each other at the first ends 102 of the first frame rail 14 and the second frame rail 16.

The rear cross-members 30, 72 are aligned with each other along the vehicle-longitudinal axis L. Specifically, the first rear cross-member 30 and the second rear cross-member 72 are aligned with each other between the first frame rail 14 and the second frame rail 16. In other words, the rear cross-members 30, 72 are aligned with each and are both elongated coaxially along the cross-vehicle axis A. The rear cross-members 30, 72 are aligned with each other at a position spaced vehicle-rearward of the first ends 102 of the first frame rail 14 and the second frame rail 16.

The first front cross-member 32 is elongated along the cross-vehicle axis A. The first front cross-member 32 is elongated along the cross-vehicle axis A from the first frame rail 14 toward the middle frame rail 18. Specifically, the first front cross-member 32 is elongated from the vehicle-inboard side 20 of the first frame rail 14 in the vehicle-inboard direction I toward the middle frame rail 18. The first front cross-member 32 may be elongated from the first frame rail 14 to the floor frame member 52. The first front cross-member 32 may be fixed to the first frame rail 14 at the first end 102 of the first frame rail 14 and to the floor frame member 52. Specifically, the first front cross-member 32 is fixed to the vehicle-inboard side 20 of the first frame rail 14 and the floor frame member 52. The first front cross-member 32 may be fixed to each of the first frame rail 14 and the floor frame member 52 in any suitable way, e.g., fasteners, a bracket, welding, etc.

The second front cross-member 70 is elongated along the cross-vehicle axis A. The second front cross-member 70 is elongated along the cross-vehicle axis A from the second frame rail 16 toward the middle frame rail 18. Specifically, the second front cross-member 70 is elongated from the vehicle-inboard side 20 of the second frame rail 16 in the vehicle-inboard direction I toward the middle frame rail 18. The second front cross-member 70 may be elongated from the second frame rail 16 to the floor frame member 52. The second front cross-member 70 may be fixed to the second frame rail 16 at the first end 102 of the second frame rail 16 and to the floor frame member 52. Specifically, the second front cross-member 70 is fixed to the vehicle-inboard side 20 of the second frame rail 16 and the floor frame member 52. The second front cross-member 70 may be fixed to each of the second frame rail 16 and the floor frame member 52 in any suitable way, e.g., fasteners, a bracket, welding, etc.

The first front cross-member 32 is spaced cross-vehicle from the second front cross-member 70. The first front cross-member 32 may be on one side of the middle frame rail 18 and the second front cross-member 70 may be on the other side of the middle frame rail 18. Specifically, the first front cross-member 32 and the second front cross-member 70 may be fixed to opposite sides of the floor frame member 52. In other words, the first front cross-member 32 and the second front cross-member 70 are spaced cross-vehicle by the floor frame member 52.

The first rear cross-member 30 is elongated along the cross-vehicle axis A. The first rear cross-member 30 is elongated along the cross-vehicle axis A from the first frame rail 14 toward the middle frame rail 18. Specifically, the first rear cross-member 30 is elongated along the cross-vehicle axis A from the first frame rail 14 to the middle frame rail 18. The first rear cross-member 30 is elongated from the vehicle-inboard side 20 of the first frame rail 14 to the first rail side 66 of the middle frame rail 18. The first rear cross-member 30 may be fixed to the first frame rail 14 at a position vehicle-rearward of the first end 102 of the first frame rail 14. Specifically, the first rear cross-member 30 is spaced vehicle-rearward from the first front cross-member 32 along the vehicle-longitudinal axis L. The first rear cross-member 30 is fixed to the vehicle-inboard side 20 of the first frame rail 14 and the first rail side 66 of the middle frame rail 18. The first rear cross-member 30 may be fixed to each of the first frame rail 14 and the middle frame rail 18 in any suitable way, e.g., fasteners, a bracket, welding, etc.

The second rear cross-member 72 is elongated along the cross-vehicle axis A. The second rear cross-member 72 is elongated along the cross-vehicle axis A from the second frame rail 16 toward the middle frame rail 18. Specifically, the second rear cross-member 72 is elongated along the cross-vehicle axis A from the second frame rail 16 to the middle frame rail 18. The second rear cross-member 72 is elongated from the vehicle-inboard side 20 of the second frame rail 16 to the second rail side 68 of the middle frame rail 18. The second rear cross-member 72 may be fixed to the second frame rail 16 at a position vehicle-rearward of the first end 102 of the second frame rail 16. Specifically, the second rear cross-member 72 is spaced vehicle-rearward from the second front cross-member 70 along the vehicle-longitudinal axis L. The second rear cross-member 72 is fixed to the vehicle-inboard side 20 of the second frame rail 16 and the second rail side 68 of the middle frame rail 18. The second rear cross-member 72 may be fixed to each of the second frame rail 16 and the middle frame rail 18 in any suitable way, e.g., fasteners, a bracket, welding, etc.

The first rear cross-member 30 is spaced cross-vehicle from the second rear cross-member 72. The first rear cross-member 30 may be on one side of the middle frame rail 18 and the second rear cross-member 72 may be on the other side of the middle frame rail 18. Specifically, as discussed above, the first rear cross-member 30 and the second rear cross-member 72 are fixed to opposite rails sides 66, 68 of the middle frame rail 18. In other words, the first rear cross-member 30 is fixed to the first rail side 66 of the middle frame rail 18 and the second rear cross-member 72 is fixed to the second rail side 68 of the middle frame rail 18. The first rear cross-member 30 and the second rear cross-member 72 are spaced cross-vehicle by the middle frame rail 18.

The middle frame rail 18 may be elongated from the rear cross-members 30, 72 to the distal end 56. Specifically, at least a portion of the middle frame rail 18 extends from the rear cross-members 30, 72 to the distal end 56. At least a portion of the middle frame rail 18 extends from the rear cross-members 30, 72 to the floor frame member 52.

With reference to FIG. 2, the three-wheeled vehicle 10 may include one or more seats 74 in the occupant compartment 36. For example, as shown in the Figures, the three-wheeled vehicle 10 may include a front seat 74, herein after referred to as the "seat 74," and a rear seat (not shown) in the occupant compartment 36. The front seat 74 may be adjacent the front end 38 and the rear seat may be adjacent the rear end 40. In other words, the front seat 74 may be vehicle-forward of the rear seat. The three-wheeled vehicle 10 may be driven by an occupant of front seat 74 and other occupants may be seated in the rear seat as passengers.

The seat 74 may include a seatback 76 and a seat bottom 78. The seatback 76 may be supported by the seat bottom 78 and may be stationary or movable relative to the seat bottom 78. The seatback 76 and the seat bottom 78 may be adjustable in multiple degrees of freedom. The seat may be moveable relative to the vehicle floor 42 to various positions, e.g., movable fore-and-aft and/or cross-vehicle. The seat 74 may be of any suitable type, e.g., a bucket seat or a bench seat elongated across the occupant compartment 36.

The seat 74 defines an occupant seating area 80. Specifically, the seatback 76 and the seat bottom 78 may define the occupant seating area 80. The occupant seating area 80 is the area occupied by an occupant when properly seated on the seat 74. The occupant seating area 80 is in a seat-forward direction of the seatback 76 and above the seat bottom 78.

The seat 74 defines a footwell area 82. The footwell is the area occupied by feet of an occupant when the occupant is seated in the occupant seating area 80. The footwell area 82 is vehicle-forward of the seat 74. Specifically, the footwell area 82 is vehicle-forward of the seat bottom 78.

The seat 74 is positioned adjacent the rear cross-members 30, 72. Specifically, the seat bottom 78 of the seat may be aligned with the rear cross-members 30, 72. In other words, the rear cross-members 30, 72 may be below the occupant seating area 80 of the seat 74 along the vertical axis V of the three-wheeled vehicle 10. The rear cross-members 30, 72 and the front cross-members 32, 70 may be below the feet of an occupant of the seat 74. The front cross-members 32, 70 are vehicle-forward of the seat 74. Specifically, the front cross-members 32, 70 are spaced vehicle-forward from the seat 74, e.g., the seat bottom 78.

The three-wheeled vehicle 10 may include one or more vehicle doors (not numbered) openable relative to the vehicle frame 12 for occupant ingress and egress. In other words, the vehicle doors provides access to the seat 74 in the occupant compartment 36. The three-wheeled vehicle 10 may include one or more vehicle doors per side of the three-wheeled vehicle 10. In the example shown in the Figures, the three-wheeled vehicle 10 may include a vehicle door adjacent the front seat 74 and a vehicle door adjacent the rear seat. The three-wheeled vehicle 10 may include an equal number of vehicle doors on the opposite side of the three-wheeled vehicle 10. The vehicle door may be hingedly connected to the vehicle frame 12.

As shown in the Figures, the three-wheeled vehicle 10 includes a single front wheel 84 and two rear wheels 86. The front wheel 84 is disposed vehicle-forward of the front end 38 of the occupant compartment 36 and the rear wheels 86 are disposed adjacent the rear end 40. In other words, the front wheel 84 is disposed at the front vehicle end and the rear wheels 86 are disposed at the rear vehicle end. The front wheel 84 and rear wheels 86 are supported by the vehicle frame 12. Specifically, the front wheel 84 is supported by the vehicle frame 12 vehicle-forward of the vehicle frame 12. In other words, the front wheel 84 is supported by the vehicle frame 12 vehicle-forward of the front end 38. The front wheel 84 is aligned with the midline M of the three-wheeled vehicle 10 in the cross-vehicle direction C. Specifically, the front wheel 84 is aligned in the cross-vehicle direction C with the middle frame rail 18.

The rear wheels 86 are supported by the vehicle frame 12 adjacent the rear end 40. The front wheel 84 is disposed at the midline M. In other words, the front wheel 84 is spaced equidistantly from each side of the three-wheeled vehicle 10 in the cross-vehicle direction C. The rear wheels 86 may be disposed on each side of the three-wheeled vehicle 10 at the rear end 40 of the three-wheeled vehicle 10. In other words, the rear wheels 86 are spaced cross-vehicle from each other. The three-wheeled vehicle 10 may include a rear wheel 86 on each side of the midline M of the three-wheeled vehicle 10.

Figure 3A:
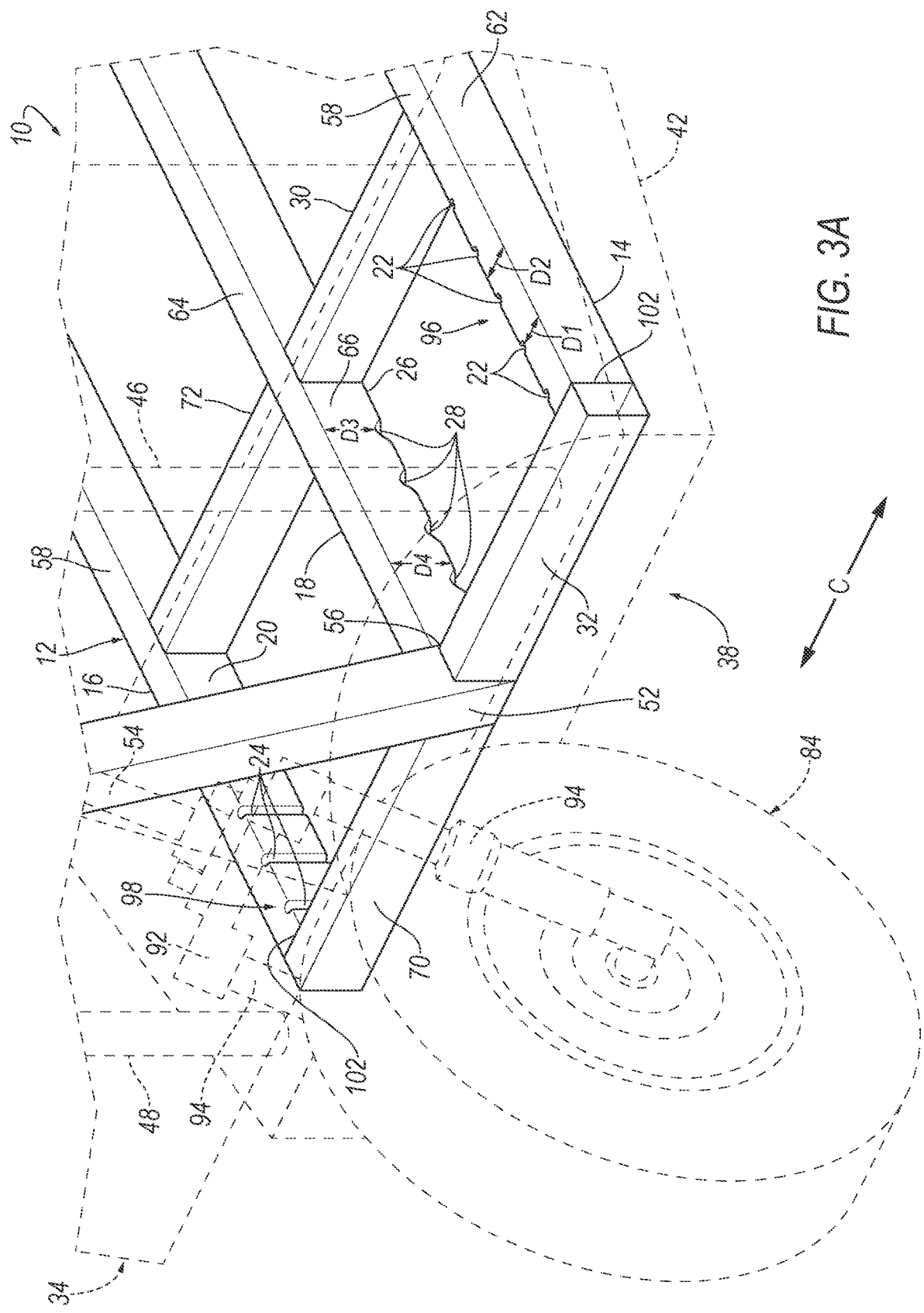
FIG. 3A is a left perspective view of the vehicle frame.
Figure 3B:
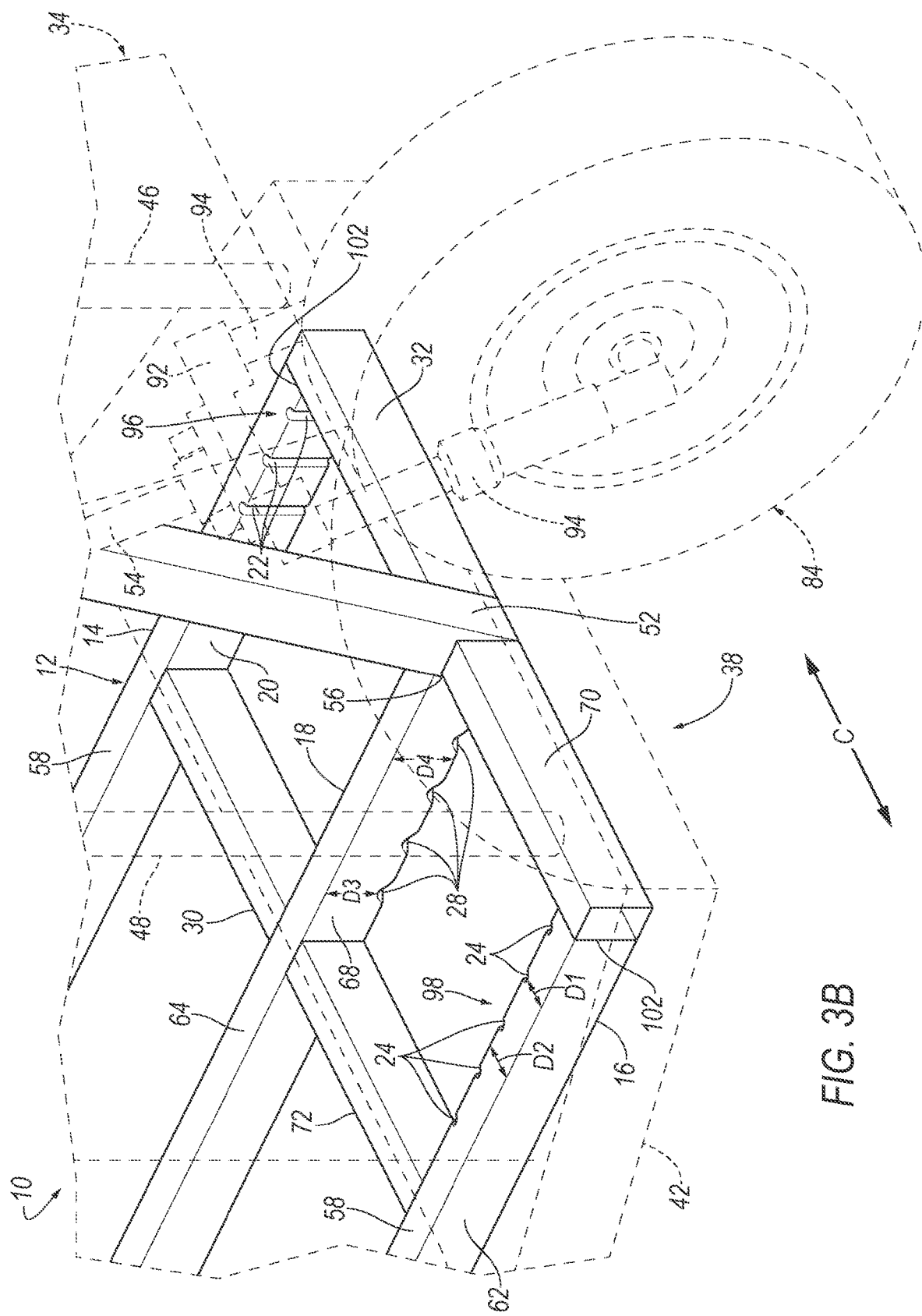
FIG. 3B is a right perspective view of the vehicle frame.
Figure 3C:
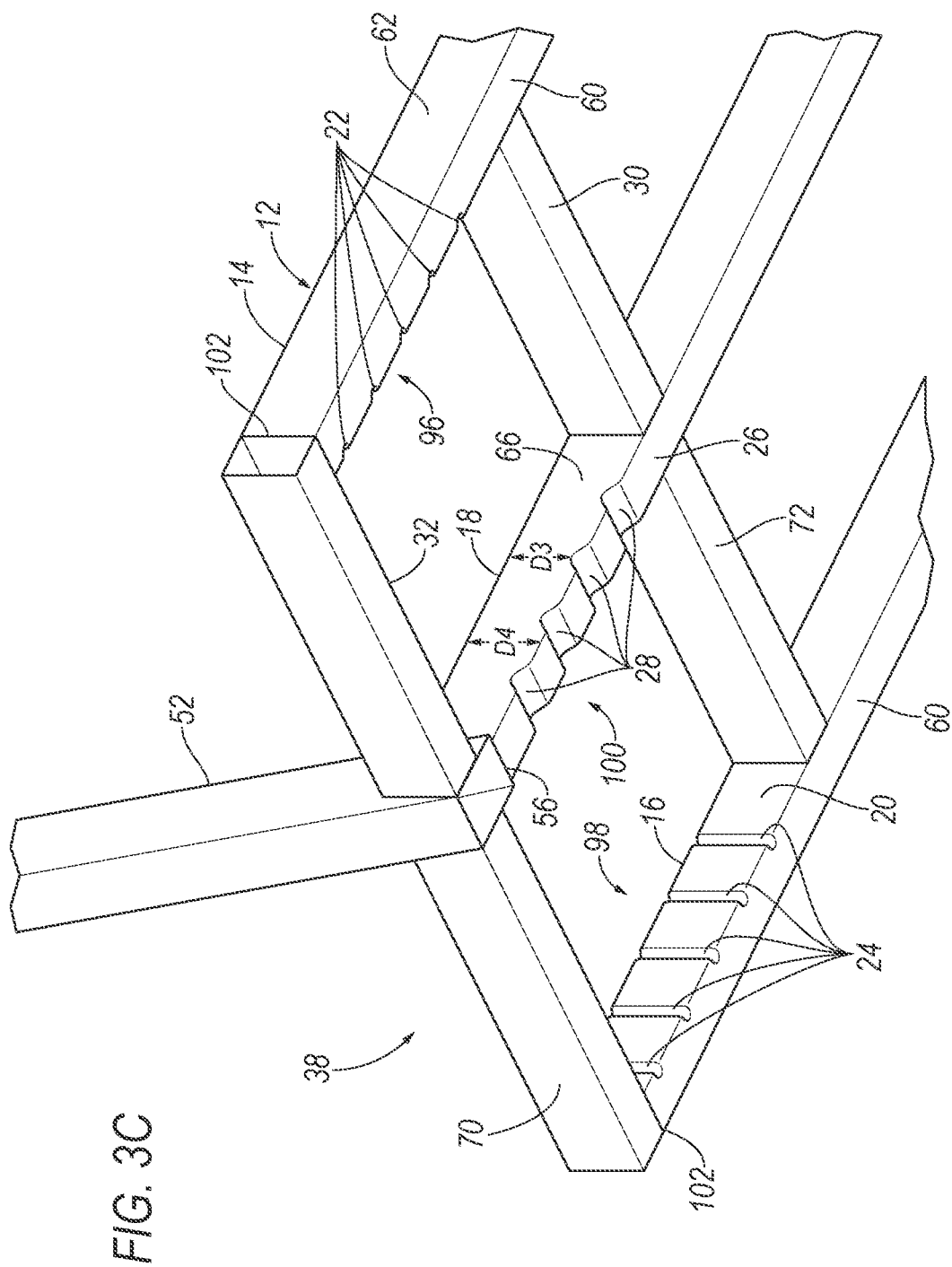
FIG. 3C is a bottom view of the vehicle frame.
Figure 4A:
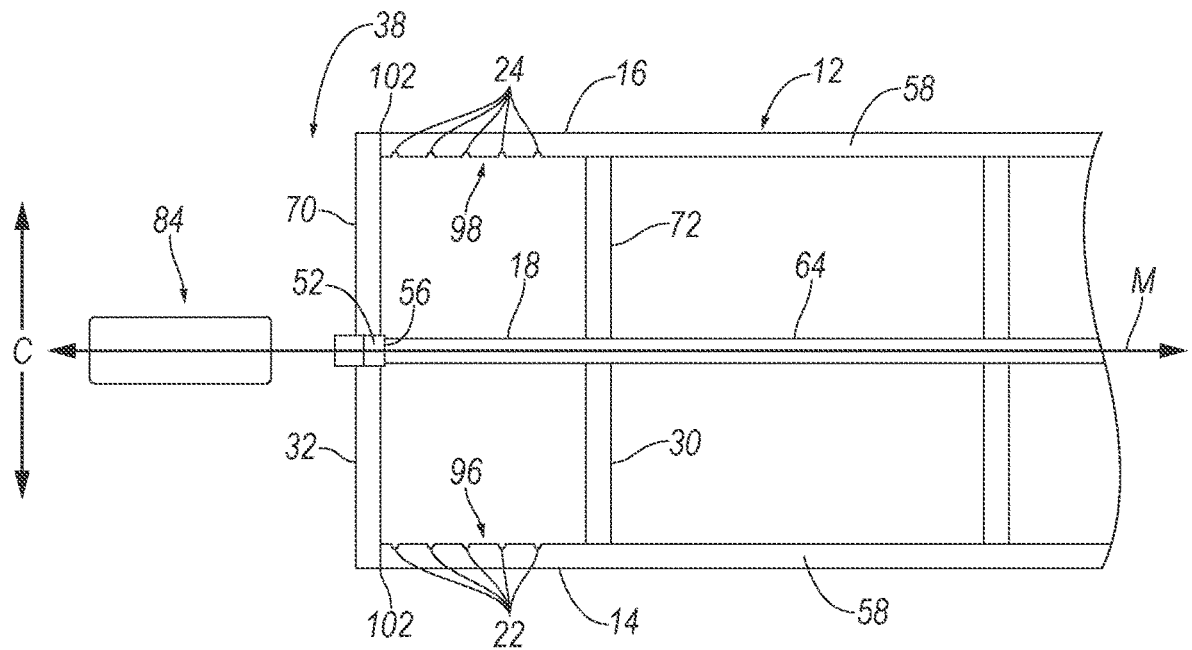
FIG. 4A is a plan view of the vehicle frame prior to certain vehicle impacts.
Figure 4B:
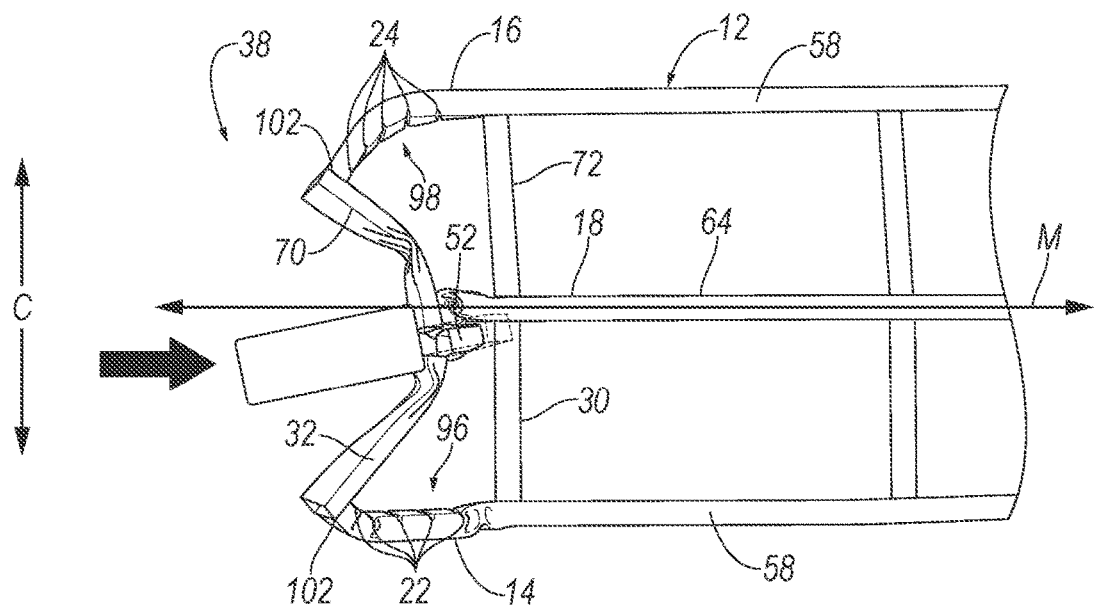
FIG. 4B is a plan view of a representation of deformation of the vehicle frame after certain vehicle impacts.
Figure 4C:
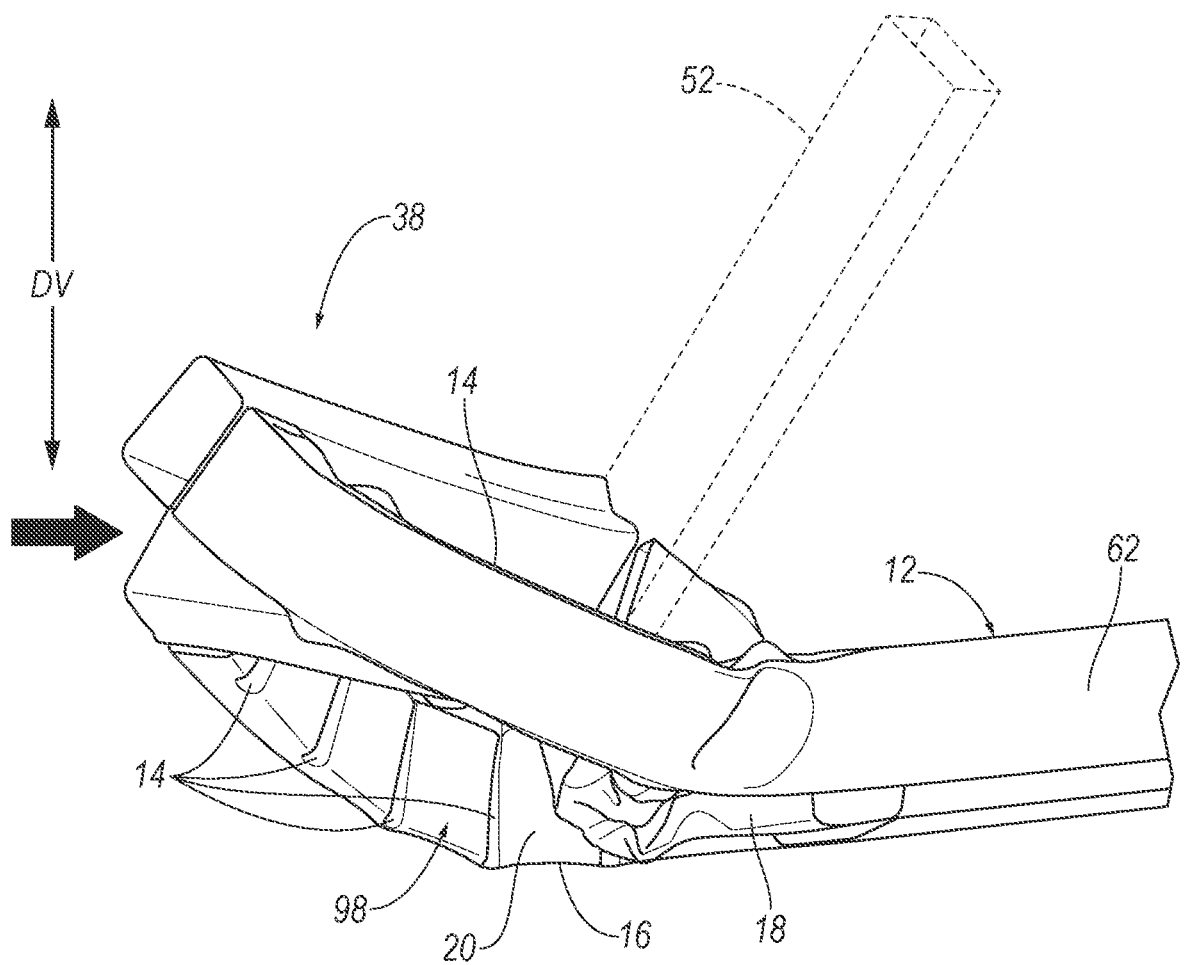
FIG. 4C is a side view of a representation of deformation of the vehicle frame after certain vehicle impacts.
Figure 5A:
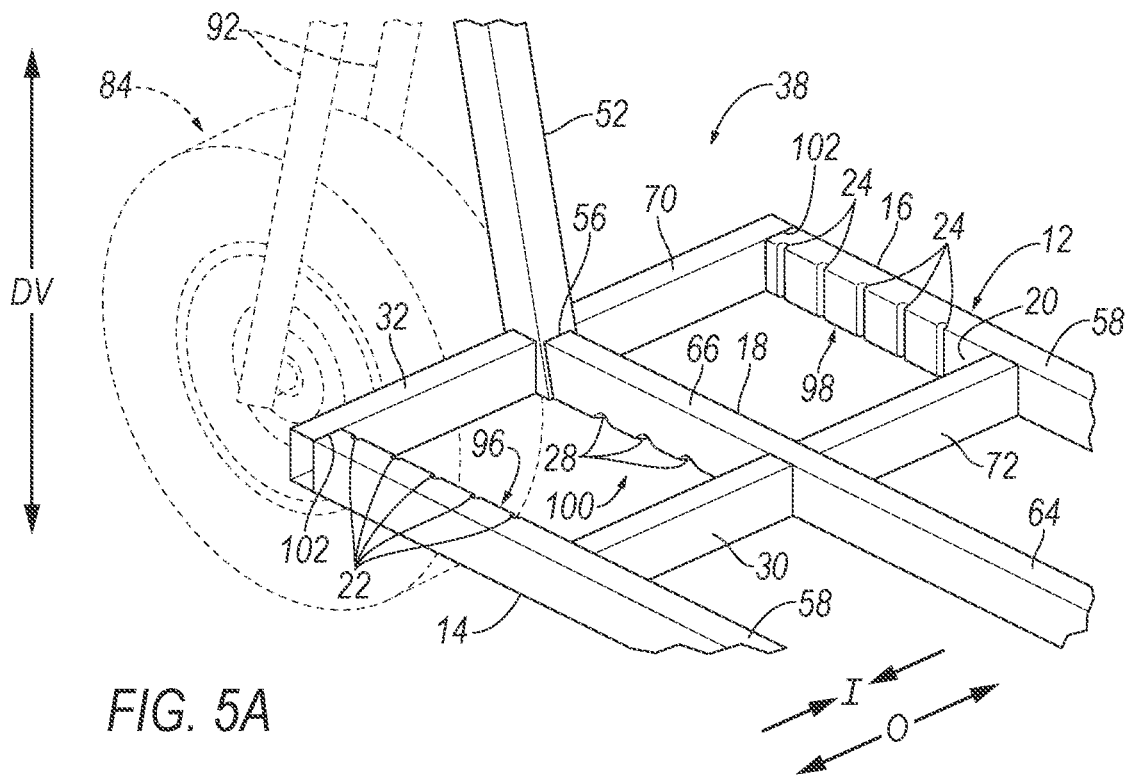
FIG. 5A is a perspective view of the vehicle frame prior to certain vehicle impacts.
Figure 5B:
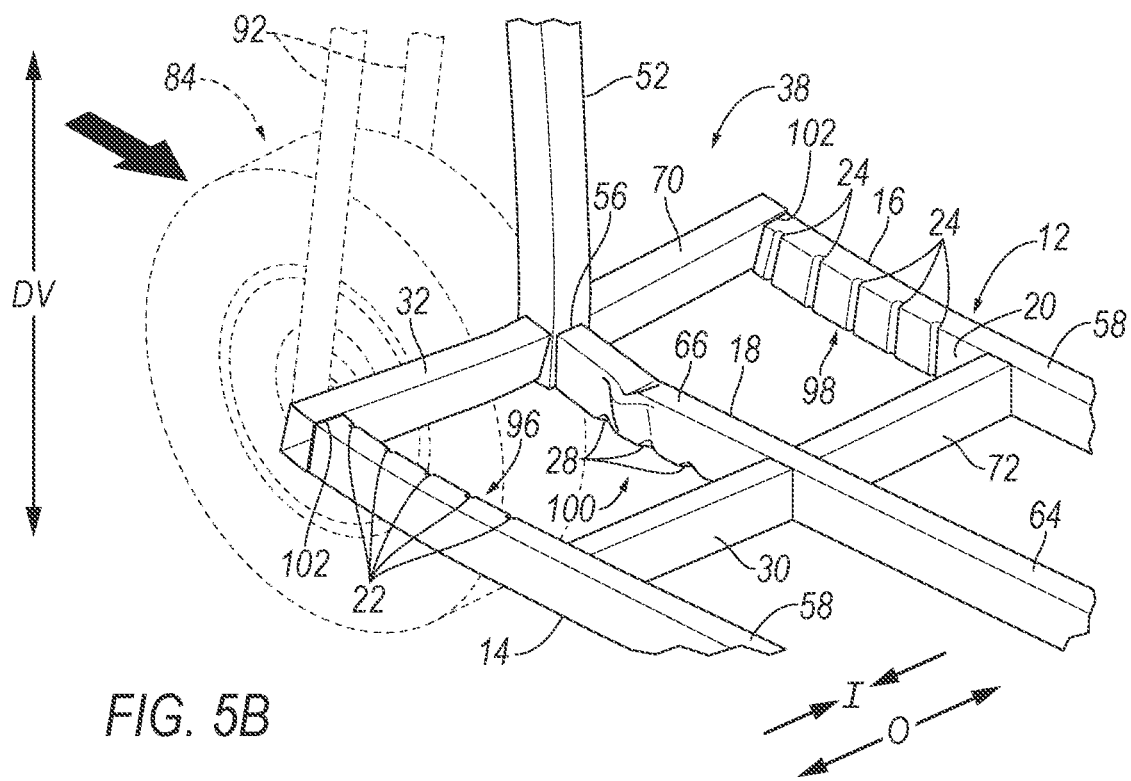
FIGS. 5B-5F is a perspective view of a representative progression of deformation of the vehicle frame after certain vehicle impacts.
Figure 5C:
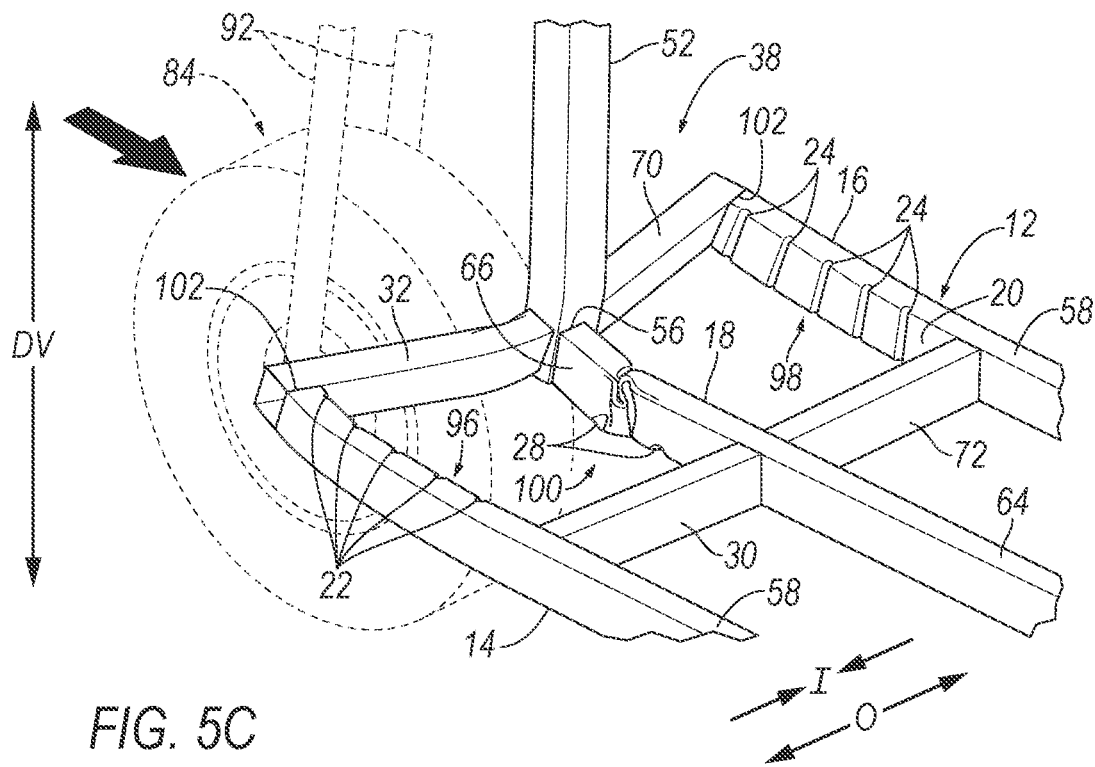
Figure 5D:
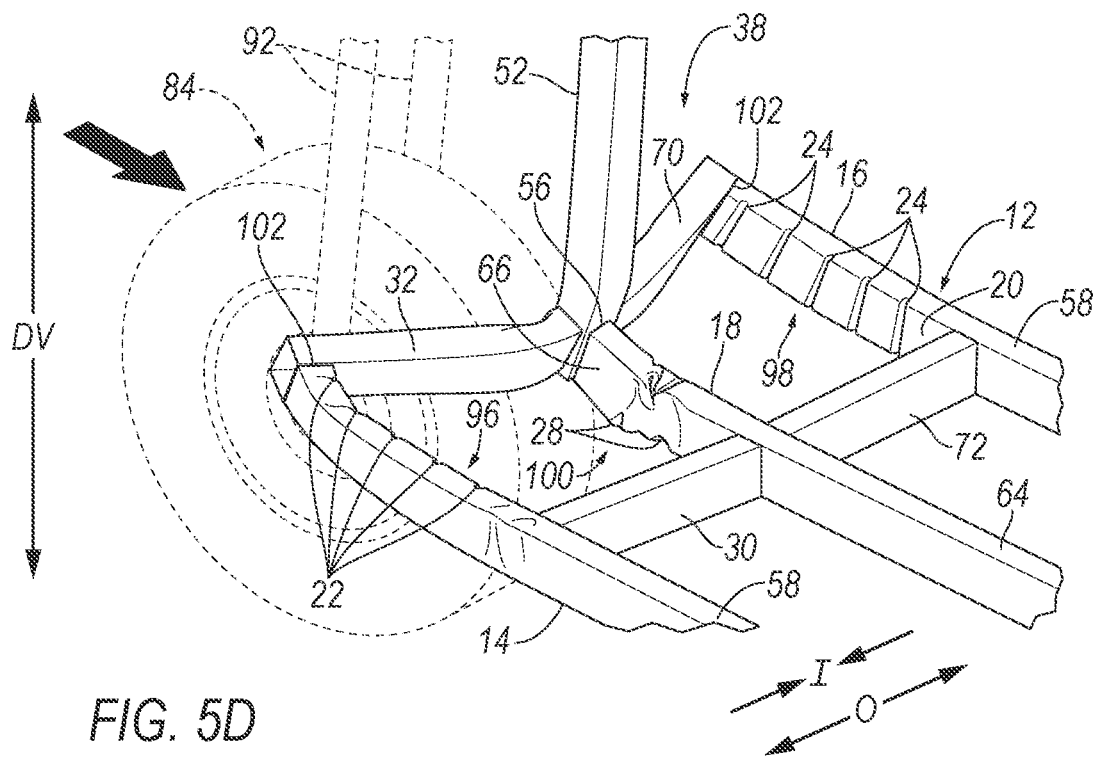
Figure 5E:
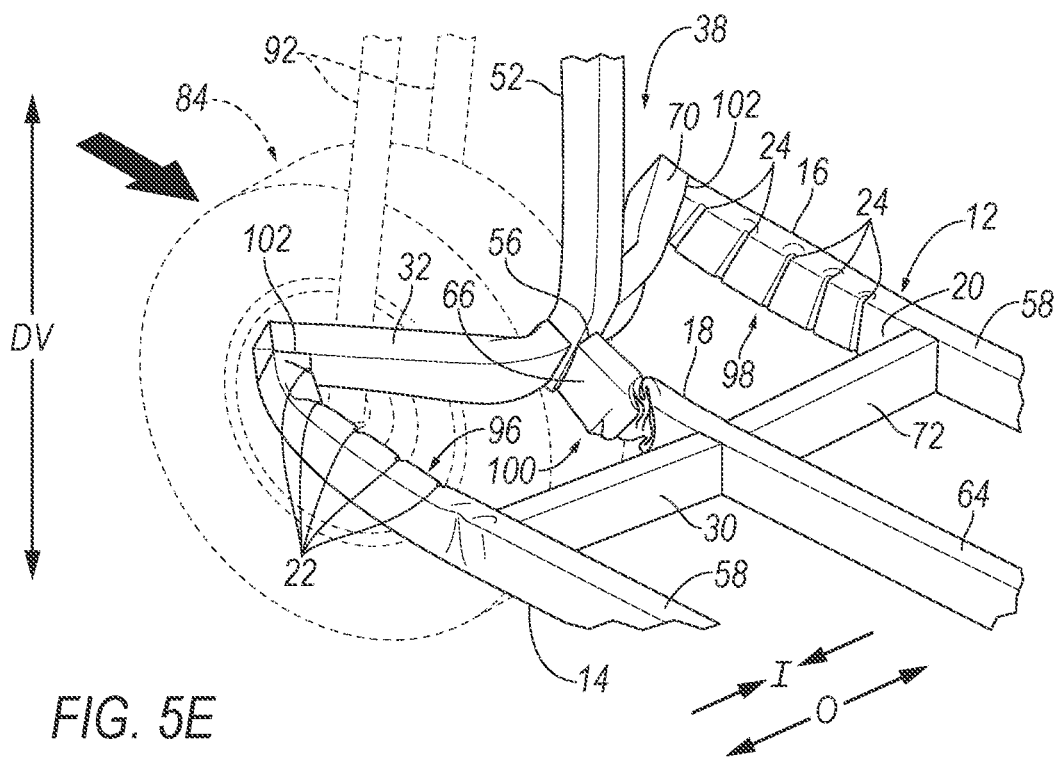
Figure 5F:
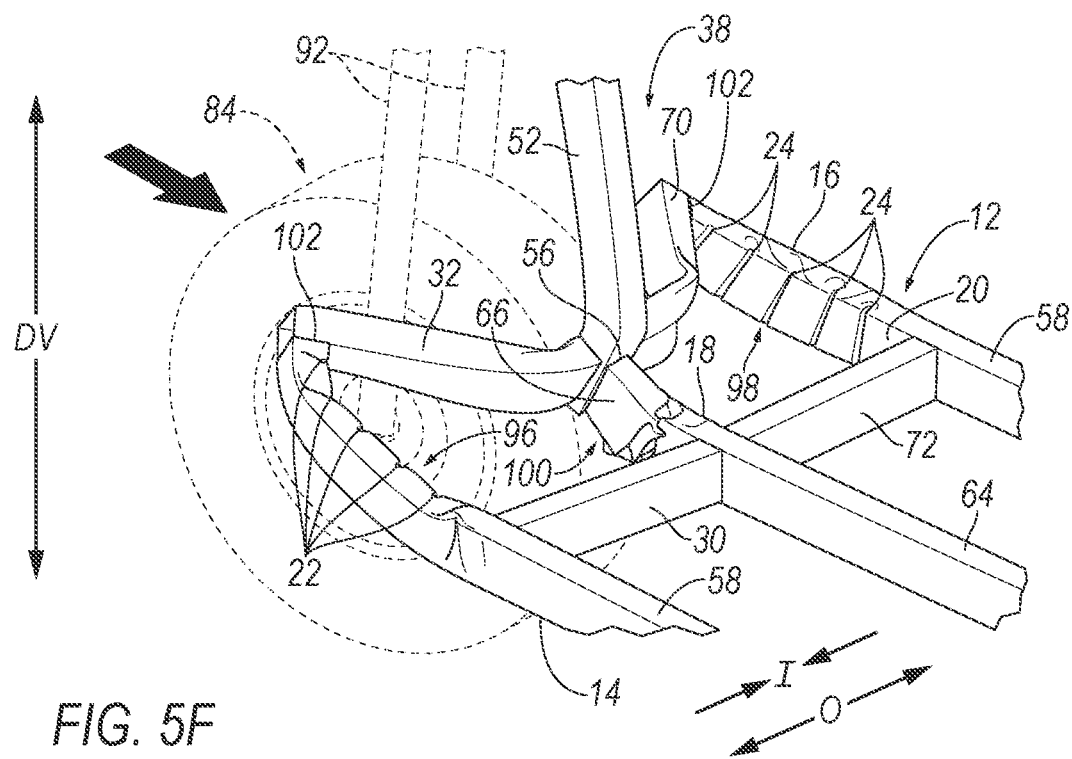

With reference to FIGS. 2-3B, the three-wheeled vehicle 10 includes a steering system 88 positioned at the front end 38. The steering system 88 is coupled to the front wheel 84 to allow an occupant to steer the three-wheeled vehicle 10 as the three-wheeled vehicle 10 is in motion. The steering system 88 is rotatably supported by the vehicle frame 12 to steer the three-wheeled vehicle 10. The steering system 88 is elongated upwardly from the front wheel 84 to a steering device 90 inside the occupant compartment 36, e.g., handlebars, a steering wheel, etc. In other words, the steering system 88 is elongated upwardly from the occupant compartment 36 to allow the occupant to have access to the steering device 90 inside the occupant compartment 36. The steering system 88 is aligned with the midline M of the three-wheeled vehicle 10. In other words, the steering system 88 may be positioned between the first post 46 and the second post 48 of the vehicle frame 12.

The steering system 88 includes the steering post 54, a crossbar 92, and a pair of beams 94. The steering device 90 is supported by the steering post 54. Specifically, the steering device 90 extends downwardly from the steering device 90 to the crossbar 92. The steering post 54 may be elongated along an axis (not labeled). The steering post 54 may be aligned with the midline M of the three-wheeled vehicle 10. In other words, the steering post 54 may be between the first post 46 and the second post 48.

The steering post 54 is rotatably supported by the vehicle frame 12. The floor frame member 52 extends upwardly from the vehicle floor 42 to the steering post 54. The steering post 54 is rotatably supported by the floor frame member 52. In other words, the steering post 54 is rotatable relative to the vehicle frame 12, i.e., the floor frame member 52. Specifically, the steering post 54 is rotatable about the axis B elongated along the steering post 54. When an occupant turns the three-wheeled vehicle 10, the occupant turns the steering device 90 in the desired direction, e.g., clockwise or counterclockwise, and the steering post 54 rotates about the axis B in the desired direction. Turning the steering device 90 turns the steering post 54 to allow the three-wheeled vehicle 10 to turn right or left during forward and rearward motion of the three-wheeled vehicle 10.

With reference to FIGS. 2A-4E, the steering post 54 is connected to the front wheel 84 such that when an occupant turns the steering device 90, the steering post 54 rotates to turn the front wheel 84 in the desired direction of the occupant. As in the example shown in the Figures, the steering post 54 is indirectly connected to the front wheel 84. In other words, other components, for example the crossbar 92 and/or the beams 94, may be between the steering post 54 and the front wheel 84 such that when the steering post 54 rotates, the front wheel 84 rotates in the desired direction of the occupant.

With reference to FIGS. 3A-5F, the first frame rail 14, the second frame rail 16, and the middle frame rail 18 each define a plurality of notches 22, 24, 28. Specifically, the first frame rail 14, the second frame rail 16, and the middle frame rail 18 each define a first set of notches 96, a second set of notches 98, and a third set of notches 100, respectively. In the event of certain vehicle impacts, the first frame rail 14, the second frame rail 16, and the middle frame rail 18 are designed to be deformable along the notches 22, 24, 28 when a force, specifically, a force along the midline M of the three-wheeled vehicle 10, is applied along the middle rail. Specifically, the first frame rail 14, the second frame rail 16, and the middle frame rail 18 are designed to be deformable along the notches 22, 24, 28 when a force is applied at the front wheel 84 during certain vehicle impacts along the midline M of the three-wheeled vehicle 10. When the force applied exceeds a predetermined threshold, the sets of notches 22, 24, 28 of the first frame rail 14, the second frame rail 16, and the middle frame rail 18 deform to manage deformation into the three-wheeled vehicle 10. The distal end 56 may deform upwardly along the vertical axis V as the force is applied and the first frame rail 14 and the second frame rail 16 may deform vehicle-inboard as the force is applied. FIGS. 4B and 4C each show a representation of deformation of the first frame rail 14, the second frame rail 16, and the middle frame rail 18 of the three-wheeled vehicle 10 after certain vehicle impacts. FIGS. 5B-5F also shows a representation of deformation of the first frame rail 14, the second frame rail 16, and the middle frame rail 18 of the three-wheeled vehicle 10 after certain vehicle impacts.

Each of the sets of notches 96, 98, 100 includes a plurality of notches 22, 24, 28. Specifically, each of the sets of notches 96, 98, 100 includes a plurality of notches 22, 24, 28 spaced equidistantly from each other along the vehicle-longitudinal axis L. In other words, the notches 22, 24, 28 are spaced equidistantly from each other along the first frame rail 14, the second frame rail 16, and the middle frame rail 18. In other words, the distances between the notches 22, 24, 28 along the frame rails 14, 16, 18 are equal. Specifically, each set of notches 96, 98, 100 includes more than one notch. For example, as shown in the Figures, the first set of notches 96 and the second set of notches 98 each include five notches 22, 24 spaced equidistantly along the first frame rail 14 and the second frame rail 16. Additionally, as shown in the example shown in the Figures, the third set of notches 100 includes four notches 28 spaced equidistantly from each other long the middle frame rail 18. Each of the first set of notches 96, the second set of notches 98, and the third set of notches 100 may each include any suitable number of notches 22, 24, 28, e.g., a larger number or lessor number of notches 22, 24, 28. The number of notches 22, 24, 28 may be dependent on design factors, for example, the length of the first frame rail 14, the second frame rail 16, and the middle frame rail 18, the size of the three-wheeled vehicle 10, etc.

One side of the first frame rail 14 and the second frame rail 16 define the first set of notches 96 and the second set of notches 98, respectively. In other words, one side of the first frame rail 14 defines the first set of notches 96 and one side of the second frame rail 16 defines the second set of notches 98. Specifically, the vehicle-inboard side 20 of the first frame rail 14 define the first set of notches 96 and the vehicle-inboard side 20 of the second frame define the second set of notches 98. Because the first set of notches 96 and the second set of notches 98 are defined by the vehicle-inboard sides 20, the first set of notches 96 and the second set of notches 98 face toward the middle frame rail 18. Specifically, the first set of notches 96 face toward the first rail side 66 of the middle frame rail 18 and the second set of notches 98 face toward the second rail side 68 of the middle frame rail 18.

The notches 22 of the first set of notches 96 and the notches 24 of the second set of notches 98 are spaced along the first frame rail 14 and the second frame rail 16. In other words, the notches 22 of the first set of notches 96 and the notches 24 of the second set of notches 98 are spaced along the vehicle-longitudinal axis L along the first frame rail 14 and the second frame rail 16. As discussed above, the notches 22 of the first set of notches 96 and the notches 24 of the second set of notches 98 are spaced equidistantly from each other along the vehicle-longitudinal axis L.

The notches 22 of the first set of notches 96 and the notches 24 of the second set of notches 98 are between the front cross-members 32, 70 and the rear cross-members 30, 72 along the first frame rail 14 and the second frame rail 16. In other words, the notches 22 of the first set of notches 96 are between the first front cross-member 32 and the first rear cross-member 30 along the first frame rail 14 and the notches 24 of the second set of notches 98 are between the second front cross-member 70 and the second rear cross-member 72 along the second frame rail 16. The notches 22 of the first set of notches 96 are between the first front cross-member 32 and the first rear cross-member 30 along the vehicle-inboard side 20 of the first frame rail 14. The notches 24 of the second set of notches 98 are between the second front cross-member 70 and the second rear cross-member 72 along the vehicle-inboard side 20 of the second frame rail 16. Specifically, the notches 22 of the first set of notches 96 and the notches 24 of the second set of notches 98 are spaced equidistantly along the vehicle-inboard sides 20 between the front cross-members 32, 70 and the rear cross-members 30, 72. In other words, the notches 22 of the first set of notches 96 and the notches 24 of the second set of notches 98 are spaced equidistantly along the vehicle-inboard sides 20 from the front cross-members 32, 70 to the rear cross-members 30, 72.

The notches 22 of the first set of notches 96 and the notches 24 of the second set of notches 98 are between the front end 38 and the seat 74 along the vehicle-longitudinal axis L. Specifically, the notches 22 of the first set of notches 96 and the notches 24 of the second set of notches 98 are vehicle-forward of the seat 74. In other words, the notches 22, 24 of the vehicle-inboard sides 20 are vehicle-forward of the seat 74. The notches 22 of the first set of notches 96 and the second set of notches 98 may be vehicle-forward of the seat bottom 78. The notches 22 of the first set of notches 96 and the notches 24 of the second set of notches 98 may be below the footwell area 82 of the three-wheeled vehicle 10. In other words, the notches 22 of the first set of notches 96 and the notches 24 of the second set of notches 98 are downwardly from the footwell area 82.

The notches 22 of the first set of notches 96 and the notches 24 of the second set of notches 98 are elongated along the width of the vehicle-inboard sides 20 of the first frame rail 14 and the second frame rail 16. In other words, the notches 22 of the first set of notches 96 and the notches 24 of the second set of notches 98 are elongated along the vertical direction DV. Specifically, the notches 22 of the first set of notches 96 and the notches 24 of the second set of notches 98 are elongated along the vertical axis V. The notches 22 of the first set of notches 96 and the notches 24 of the second set of notches 98 are each elongated between the top sides 58 and the bottom sides 60 of the first frame rail 14 and the second frame rail 16. Specifically, the notches 22 of the first set of notches 96 and the notches 24 of the second set of notches 98 are each elongated from the top sides 58 to the bottom sides 60 of the first frame rail 14 and the second frame rail 16.

The first frame rail 14 and the second frame rail 16 each define a distance D1 between the vehicle-inboard sides 20 and the vehicle-outboard sides 62. For example, as discussed above, the width of the top sides 58 defines the distance D1, D2 between the vehicle-inboard sides 20 and the vehicle-outboard sides 62. The distance D1, D2, e.g., the widths of the top sides 58 and the bottom sides 60, between the vehicle-inboard sides 20 and the vehicle-outboard sides 62 may be different depending on the location along the first frame rail 14 and the second frame rail 16. At the notches 22, 24 of each of the first frame rail 14 and the second frame rail 16, the distance D2 between the vehicle-inboard sides 20 and the vehicle-outboard sides 62 may be different at the notches 22, 24 from the distance D1 between the vehicle-inboard sides 20 and the vehicle-outboard sides 62 between the notches 22, 24 along the first frame rail 14 and the second frame rail 16. Specifically, the distance D1 between the vehicle-inboard sides 20 and the vehicle-outboard sides 62 may be larger between the notches 22, 24 than the distance D2 at each of the notches 22, 24. Said another way, the distance D2 between the vehicle-inboard sides 20 and the vehicle-outboard sides 62 is shorter at the notches 22, 24 than the distance D1 between the notches 22, 24. In other words, the vehicle-inboard sides 20 are closer in proximity to the vehicle-outboard sides 62 at the notches 22, 24 than between the notches 22, 24.

The notches 22 of the first set of notches 96 and the notches 24 of the second set of notches 98 allow the first frame rail 14 and the second frame rail 16 to deform in the event of certain vehicle impacts. In other words, the first frame rail 14 and the second frame rail 16 deform at each of the notches 22, 24 along each of the frame rails 14, 16. The notches 22, 24 may collapse along the vehicle-longitudinal axis L to allow the first frame rail 14 and the second frame rail 16 to deform in the event of certain vehicle impacts. The distance D2 being shorter between the vehicle-inboard sides 20 and the vehicle-outboard sides 62 at the notches 22, 24 allows for the deformation of the first frame rail 14 and the second frame rail 16 to occur at the notches 22, 24. As the notches 22, 24 deform, the first ends 102 of the first frame rail 14 and the second frame rail 16 may move upwardly and vehicle-inboard to manage deformation into the three-wheeled vehicle 10. Specifically, the first ends 102 of the first frame rail 14 and the second frame rail 16 may move upwardly and vehicle-inboard to manage deformation into the occupant compartment 36.

One side of the middle frame rail 18 defines the third set of notches 100. Specifically, the downward side 26 of the middle frame rail 18 defines the third set of notches 100. Because the downward side 26 of the middle frame rail 18 defines the third set of notches 100, the third set of notches 100 face downwardly away from the occupant compartment 36. In other words, the third set of notches 100 face downwardly, for example, toward the roadway exterior to the three-wheeled vehicle 10.

The notches 28 of the third set of notches 100 are spaced along the middle frame rail 18. In other words, the notches 28 of the third set of notches 100 are spaced along the vehicle-longitudinal axis L along the middle frame rail 18. In other words, the notches 28 of the third set of notches 100 may be spaced along the midline M of the three-wheeled vehicle 10. As discussed above, the notches 28 of the third set of notches 100 are spaced equidistantly from each other along the vehicle-longitudinal axis L. Specifically, the notches 28 of the third set of notches 100 are spaced equidistantly from each other along the midline M of the three-wheeled vehicle 10.

The notches 28 of the third set of notches 100 are between the front cross-members 32, 70 and the rear cross-member along the middle frame rail 18. The notches 28 of the third set of notches 100 are between both the front cross-member and the rear cross-members 30, 72 along the vehicle-longitudinal axis L. The notches 28 of the third set of notches 100 are spaced along the middle frame rail 18 between the front cross-members 32, 70 and the rear cross-members 30, 72. Specifically, the notches 28 of the third set of notches 100 are spaced along the portion of the middle frame rail 18 that is between the rear cross-members 30, 72 and the distal end 56 of the middle frame rail 18. The notches 28 of the third set of notches 100 are spaced along the downward side 26 of the middle frame rail 18 between the rear cross-members 30, 72 and the distal end 56. The notches 28 of the third set of notches 100 are spaced along the downward side 26 of the middle frame rail 18 between the rear cross-members 30, 72 and the floor frame member 52. The notches 28 of the third set of notches 100 are spaced equidistantly from each other along the middle frame rail 18. Specifically, the notches 28 are spaced equidistantly along the downward side 26 along the vehicle-longitudinal axis L. In other words, the notches 28 of the third set of notches 100 are spaced equidistantly between the rear cross-members 30, 72 and the distal end 56.

The notches 28 of the third set of notches 100 are elongated along the width of the downward side 26 of the middle frame rail 18. In other words, the notches 28 of the third set of notches 100 are elongated along the cross-vehicle direction C. Specifically, the notches 28 of the third set of notches 100 are elongated along the cross-vehicle axis A. The notches 28 of the third set of notches 100 are each elongated between the first rail side 66 and the second rail side 68. Specifically, the notches 28 of the third set of notches 100 are elongated from the first rail side 66 to the second rail side 68.

The notches 28 of the third set of notches 100 are perpendicular to the notches 22 of the first set of notches 96 and the notches 24 of the second set of notches 98. Because the downward side 26 of the middle frame rail 18 is perpendicular to the vehicle-inboard sides 20 of the first frame rail 14 and the second frame rail 16, the notches 28 of the third set of notches 100 are elongated in a plane perpendicular to the plane along which the notches 22 of the first set of notches 96 and the notches 24 of the second set of notches 98 are elongated. In other words, an angle between the plane along which the notches 28 of the third set of notches 100 are elongated and the plane along which the notches 22, 24 of the first set of notches 96 and the second set of notches 98 are elongated is 90 degrees.

The middle frame rail 18 each define a distance D3 between the upward side 64 and the downward side 26. For example, as discussed above, the width of the first rail side 66 and the second rail side 68 defines the distance D3, D4 between the upward side 64 and the downward side 26. The distance D3, D4, e.g., the widths of the first rail side 66 and the second rail side 68, between the upward side 64 and the downward side 26 may be different depending on the location along the middle frame rail 18. Specifically, at the notches 28 of the middle frame rail 18, a distance D4 between the upward side 64 and the downward side 26 at the notches 28 may be different from the distance D3 between the upward side 64 and the downward side 26 between the notches 28 along the middle frame rail 18. Specifically, the distance D3 between the upward side 64 and the downward side 26 may be larger between the notches 28 than the distance D4 at each of the notches 28. Said another way, the distance D4 between the upward side 64 and the downward side 26 is shorter at the notches 28 than the distance D3 between the notches 28. In other words, the upward side 64 is closer in proximity to the downward side 26 at the notches 28 than between the notches 28.

The notches 28 of the third set of notches 100 allow the middle frame rail 18 to deform in the event of certain vehicle impacts. In other words, the middle frame rail 18 deforms at each of the notches 28 along the middle frame rail 18. The notches 28 may collapse along the vehicle-longitudinal axis L to allow the middle frame rail 18 to deform in the event of certain vehicle impacts. The distance D4 being shorter between the upward side 64 and the downward side 26 at the notches 28 allows the deformation of the middle frame rail 18 to occur at the notches 28. As the middle frame rail 18 deforms, the distal end 56 of the middle frame rail 18 may move upwardly along the vertical axis V to manage deformation into the three-wheeled vehicle 10. Specifically, the middle frame rail 18 moving upwardly along the vehicle-vertical axis V may manage deformation into the occupant compartment 36 in the event of certain vehicle impacts. The middle frame rail 18 may deform along the vehicle-longitudinal axis L. Specifically, in the event of certain vehicle impacts, the distal end 56 may move vehicle-rearward along the vehicle-longitudinal axis L to manage deformation into the three-wheeled vehicle 10. As discussed above, FIGS. 4B and 4C each show a representation of deformation of the first frame rail 14, the second frame rail 16, and the middle frame rail 18 of the three-wheeled vehicle 10 after certain vehicle impacts. FIGS. 5B-5F also shows a representation of deformation of the first frame rail 14, the second frame rail 16, and the middle frame rail 18 of the three-wheeled vehicle 10 after certain vehicle impacts.

The notches 28 of the third set of notches 100 are between the front end 38 and the seat 74 along the vehicle-longitudinal axis L. Specifically, the notches 28 of the third set of notches 100 are vehicle-forward of the seat 74. In other words, the notches 28 of the downward side 26 is vehicle-forward of the seat 74. The notches 28 of the third set of notches 100 may be vehicle-forward of the seat bottom 78. The notches 28 of the third set of notches 100 may be below the footwell area 82 of the three-wheeled vehicle 10. In other words, the notches 28 of the third set of notches 100 are downwardly from the footwell area 82.

The disclosure has been described in an illustrative manner, and it is to be understood that the terminology which has been used is intended to be in the nature of words of description rather than of limitation. The numerical adjectives "first," "second," and "third" are used herein merely as identifiers and do not signify order or importance. Many modifications and variations of the present disclosure are possible in light of the above teachings, and the disclosure may be practiced otherwise than as specifically described.

What is claimed is:

1. A vehicle comprising:
a vehicle frame including a first frame rail, a second frame rail spaced cross-vehicle from the first frame rail, and a middle frame rail between the first frame rail and the second frame rail, the middle frame rail being on a longitudinal axis of the vehicle frame that is spaced equidistantly from the first frame rail and the second frame rail;
the first frame rail and the second frame rail each having a vehicle-inboard side facing toward the middle frame rail, the vehicle-inboard sides each defining a plurality of notches;
the middle frame rail having a downward side facing downwardly in a plane perpendicular to the vehicle-inboard sides, the downward side defining a plurality of notches;
the vehicle frame having a rear cross-member and a front cross-member spaced vehicle-forward of the rear cross-member, the rear cross-member and the front cross-member are between the first frame rail and the second frame rail; and the notches of the vehicle-inboard sides and the notches of the downward side are between the rear cross-member and the front cross-member; and a front wheel vehicle-forward of the vehicle frame, the front wheel being on the longitudinal axis of the vehicle frame.

2. The vehicle of claim 1, wherein the first frame rail, the second frame rail, and the middle frame rail are elongated along the longitudinal axis of the vehicle frame, the notches of the vehicle-inboard sides and the notches of the downward side are spaced equidistantly along the longitudinal axis of the vehicle frame.

3. The vehicle of claim 1, wherein the front cross-member and the rear cross-member are elongated along a cross-vehicle axis, the notches of the downward side being elongated along the cross-vehicle axis.

4. The vehicle of claim 1, wherein the vehicle-inboard sides are elongated along a vertical axis, the notches of the vehicle-inboard sides being elongated along the vertical axis.

5. The vehicle of claim 1, wherein the notches of the vehicle-inboard sides face toward the middle frame rail.

6. The vehicle of claim 1, wherein the first frame rail and the second frame rail include a vehicle-outboard side spaced vehicle-outboard from the vehicle-inboard side, a distance between the vehicle-inboard side and the vehicle-outboard side being larger between the notches than at the notches.

7. The vehicle of claim 1, further comprising:
a second front cross-member spaced cross-vehicle from the front cross-member;
the front cross-member extending from the first frame rail toward the middle frame rail and the second front cross-member extending from the second frame rail toward the middle frame rail;
a second rear cross-member spaced cross-vehicle from the rear cross-member; and
the rear cross-member extending from the first frame rail to the middle frame rail and the second rear cross-member extending from the second frame rail to the middle frame rail.

8. The vehicle of claim 7, wherein the notches of the first frame rail are spaced equidistantly from the front cross-member to the rear cross-member and the notches of the second frame rail are spaced equidistantly from the second front cross-member to the second rear cross-member.

9. The vehicle of claim 1, wherein the middle frame rail is spaced vehicle-inboard from the first frame rail and the second frame rail.

10. The vehicle of claim 1, wherein the middle frame rail is elongated from the rear cross-member to a distal end, the notches of the downward side being spaced equidistantly between the rear cross-member and the distal end.

11. The vehicle of claim 1, wherein the first frame rail, the second frame rail, and the middle frame rail are designed to be deformable along the notches when a force is applied along the middle rail.

12. The vehicle of claim 1, further comprising a seat positioned adjacent the rear cross-member.

13. The vehicle of claim 12, wherein the notches of the vehicle-inboard side and the notches of the downward side are vehicle-forward of the seat.

14. The vehicle of claim 12, wherein the front cross-member is vehicle-forward of the seat.

15. The vehicle of claim 1, wherein the first frame rail, the second frame rail, and the middle frame rail are designed to be deformable along the notches when a force is applied at the front wheel.

16. The vehicle of claim 1, further comprising:
a steering post connected to the front wheel to turn the front wheel; and
a member extending upwardly from the middle frame rail to the steering post.

17. The vehicle of claim 1, wherein vehicle-forward ends of the first frame rail and the second frame rail move upwardly and vehicle-inboard as the notches of the vehicle-inboard sides of the first and second frame rails deform, and a vehicle-forward end of the middle frame rail moves upwardly as the notches of the downward side of the middle frame rail deform.

* * * * *